Patented June 3, 1930

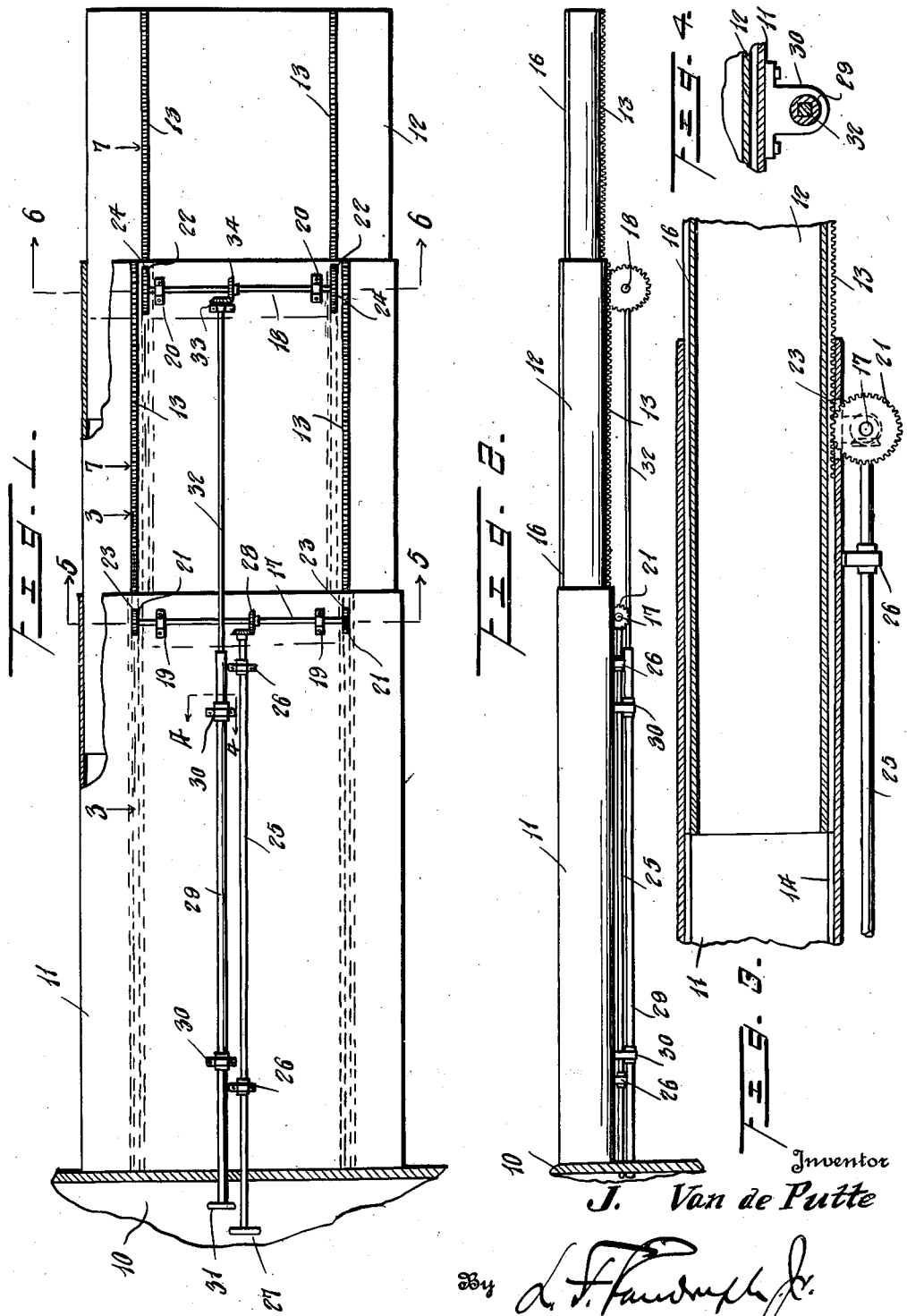

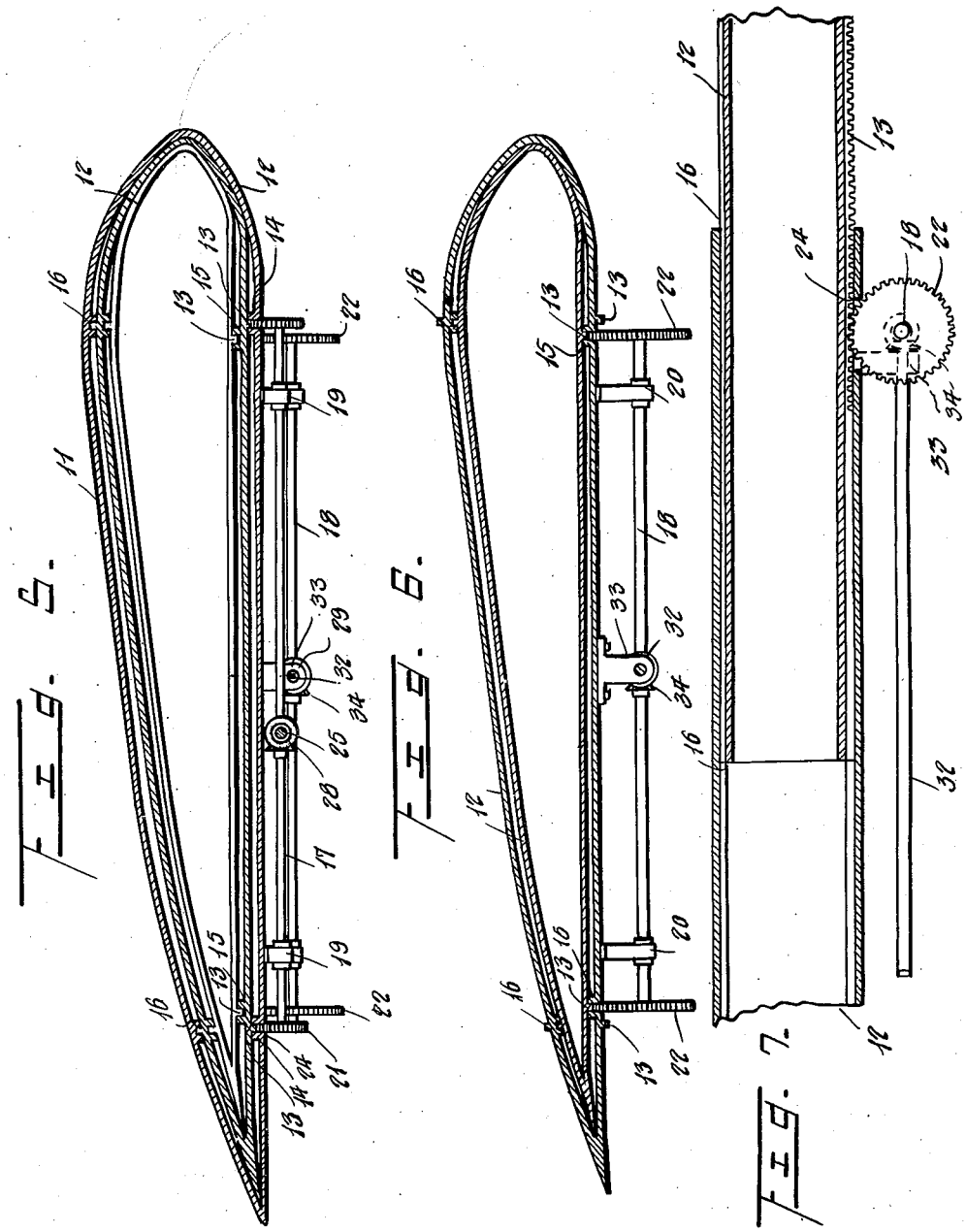

1,762,002

UNITED STATES PATENT OFFICE

JOHN VAN DE PUTTE, OF SAN ANTONIO, TEXAS

VARIABLE-SURFACE WING FOR AEROPLANES

Application filed February 21, 1929. Serial No. 341,726.

This invention relates to a plane or wing of an aeroplane or airship and the main object is to provide a construction which is extensible or adjustable as to area so as to readily vary the size of the wings in accordance with the well known factors or conditions which constantly change in flights and such as the weight of the aeroplane, the velocity of the aeroplane and the intensity and direction of the wind.

Another object is to provide a novel construction wherein the means for varying the area of the wing or plane are readily accessible from the driver's seat in the fuselage to the end that such means may be instantly manipulated.

The more specific objects and advantages will become apparent from a consideration of the description following taken in connection with accompanying drawings illustrating an operative embodiment.

In said drawings:—

Figure 1 is a view primarily in inverted plan showing the invention in connection with a fragment of the fuselage, parts being shown in section to disclose details, Figure 2 is a side elevation of the parts of Figure 1, Figure 3 is a sectional view taken on the line 3—3 of Figure 1, Figure 4 is a sectional view taken on the line 4—4 of Figure 1, Figure 5 is a sectional view taken on the line 5—5 of Figure 1, Figure 6 is a sectional view taken on the line 6—6 of Figure 1, and Figure 7 is a sectional view taken on the line 7—7 of Figure 1.

Referring specifically to the drawings, 10 fragmentarily designates a conventional body or fuselage of an aeroplane from which a wing section 11 extends laterally, being rigidly fastened thereto. According to the invention, any desired number of the plane or wing sections may be used and for instance additional sections are employed as at 12. The sections may be of any desired cross sectional configuration. As shown they are hollow and the sections 12 telescope with each other and one of them telescopes into section 11, the construction being such that sections 12 may slide completely one within the other and both within the section 11.

Each of the sections 12 has a plurality of rack bars 13 fastened thereto on the lower surfaces, the rack bars 13 of the larger section 12 being slidably accommodated between ribs 14 on the interior of the section 11. The rack bars 13 of the other section 12 are slidably disposed between ribs 15 interiorly of the companion section 12. The coacting upper surfaces of the sections 11 and 12 have interfitting side and reenforcing ribs as at 16.

Transverse shafts 17 and 18 are transversely journaled in bearings 19 and 20 on the under surfaces of the section 11 and larger section 12, respectively and on their ends pinions 21 and 22 are journaled, respectively entering openings 23 and 24 in the adjacent sections and meshing with the adjacent rack bars 13.

An operating shaft for the shaft 17 is shown at 25 being journaled in bearings 26 on the under surface of the section 11 and extending loosely through the wall of the fuselage 10 and having an operating knob 27 thereon adjacent the driver's seat so that he may reach it while seated. A bevel gear connection 28 is made between the shafts 17 and 25.

Parallel with the shaft 25 and relatively close thereto is an operating shaft 29 for the shaft 18. Shaft 29 is journaled in bearings 30 on the under surface of the section 11 and such shaft passes loosely through the wall of the fuselage and has an operating knob 31 thereon. Shaft 29 has a section 32 telescoped therewith and the telescopic portions of which shafts 29 and 32 are square in cross section as shown in Figure 4. Section 32 is journaled in a bearing 33 on the under surface of the larger section 12 and has a bevel gear connection at 34 with the shaft 18.

As a result of the construction described, the knobs 27, 31 may individually or jointly be turned so as to move the sections 12 relatively to each other and relatively to the section 11, to thereby vary the area of the wing or plane according to the conditions most favorable for flights, it being realized that both of the knobs 27 and 31 are within ready access of the operator while seated and that the gearing is of such construction that the said ribs reenforce the sections and automatically hold the sections in any position to which they are adjusted.

Various changes may be resorted to provided they fall within the spirit and scope of the invention.

I claim as my invention :—

1. A wing of the class described comprising a plurality of hollow sections in telescopic relation, one of said sections on its inner surface having spaced ribs, the other section on its outer surface having a bar disposed between the ribs, said bar having rack teeth, the other section having an opening, pinions disposed in said opening and in mesh with said rack teeth, and means on the exterior of the wings to operate said pinions.

2. A wing of the class described comprising a plurality of hollow sections in telescopic relation, the inner surface of one of the sections having a plurality of pairs of spaced longitudinally extending ribs, the other section on its outer surface having a pair of bars disposed between said ribs, said bars having rack teeth, one of the sections having openings, a shaft journaled on the exterior of the latter section, pinions on said shaft disposed in said openings and in mesh with said rack teeth, and operating means for said shaft disposed on the exterior of one of the sections at a right angle to said shaft, and gearing between said shafts.

In testimony whereof I affix my signature.

JOHN VAN de PUTTE.